United States Patent [19]

Knochel

[11] Patent Number: 4,477,974

[45] Date of Patent: Oct. 23, 1984

[54] DEVICE FOR CHECKING BILLS OF CURRENCY TO DETECT BILLS WHICH ARE STUCK TOGETHER

[76] Inventor: E. Stanley Knochel, 4202 Glenmore Ave., Baltimore, Md. 21206

[21] Appl. No.: 377,363

[22] Filed: May 12, 1982

[51] Int. Cl.³ .............................................. G01B 3/38
[52] U.S. Cl. ................................................. 33/168 R
[58] Field of Search ............. 33/168 R, 168 B, 143 R, 33/143 H, 163, 147 E; 209/534, 675

[56] References Cited

U.S. PATENT DOCUMENTS

| | | | |
|---|---|---|---|
| 188,982 | 3/1877 | Sutton | 33/168 R X |
| 212,288 | 2/1879 | Vassar | 33/147 F |
| 824,064 | 6/1906 | Callan | 33/147 F |
| 1,300,210 | 4/1919 | Cady | 33/147 E |
| 1,393,009 | 10/1921 | Carroll | 33/168 R X |
| 1,491,100 | 4/1924 | Hoke | 33/143 H X |
| 2,219,621 | 10/1940 | Buccicone | 33/147 E |
| 3,166,172 | 1/1965 | Kelsey et al. | 33/147 L X |

FOREIGN PATENT DOCUMENTS

| | | | |
|---|---|---|---|
| 167592 | 1/1951 | Austria | 33/168 B |
| 499579 | 11/1919 | France | 33/168 B |
| 158693 | 2/1921 | United Kingdom | 33/143 H |
| 581435 | 10/1946 | United Kingdom | 33/174 H |

OTHER PUBLICATIONS

Machinery: Built-Up Snap Gauges, 6/25, p. 818.

Primary Examiner—Harry N. Haroian
Attorney, Agent, or Firm—Shlesinger, Arkwright, Garvey & Fado

[57] ABSTRACT

A device for checking bills of currency to detect bills which are stuck together including two stationary portions having opposed gauging surfaces which are spaced apart a distance slightly greater than the thickness of a bill of currency, whereby a single bill will pass between the gauging surfaces, but two or more bills which are stuck together will not pass.

13 Claims, 7 Drawing Figures

DEVICE FOR CHECKING BILLS OF CURRENCY TO DETECT BILLS WHICH ARE STUCK TOGETHER

BACKGROUND OF THE INVENTION

In the handling of currency by banks, stores and other businesses where large sums of money are exchanged, considerable difficulty has been experienced in correctly counting the bills because of the tendency of the bills to stick together. This problem is accentuated in the case of newly printed bills which are arranged in packs and are in a flat, unwrinkled state. Various mechanical and chemical materials adapted to be applied to the fingers have been employed to aid in the detection of stuck bills and have been partially successful in solving this problem. However, on occasion, two or more bills which have been stuck together are not detected, resulting in a financial loss to the person counting the money. Additionally, the handling or counting of bills in this manner is very slow and tedious since every bill must be carefully checked, thereby substantially lengthening each transaction.

SUMMARY OF THE INVENTION

The present invention is a device for checking bills of currency to positively insure that no bills are stuck together, which device includes portions having gauging surfaces spaced a predetermined distance apart so that a single bill will pass between the gauging surfaces, but two or more bills will not pass.

The device of the present invention includes a base which may be adhesively engaged with a supporting surface, and a gauge which comprises a first stationary portion which may be a part of the base or secured thereto, and a second portion in parallel relation to the first portion, the first and second portions having gauging surfaces which are spaced apart a distance which is slightly greater than the thickness of a bill of currency.

With the device of the present invention, bills of currency may be rapidly checked without prior careful inspection by the user, with the assurance that only a single bill will pass through the device, and bills which are stuck together will not pass.

DESCRIPTION OF FORM OF INVENTION ILLUSTRATED IN FIGS. 1 AND 2

Figure 1:
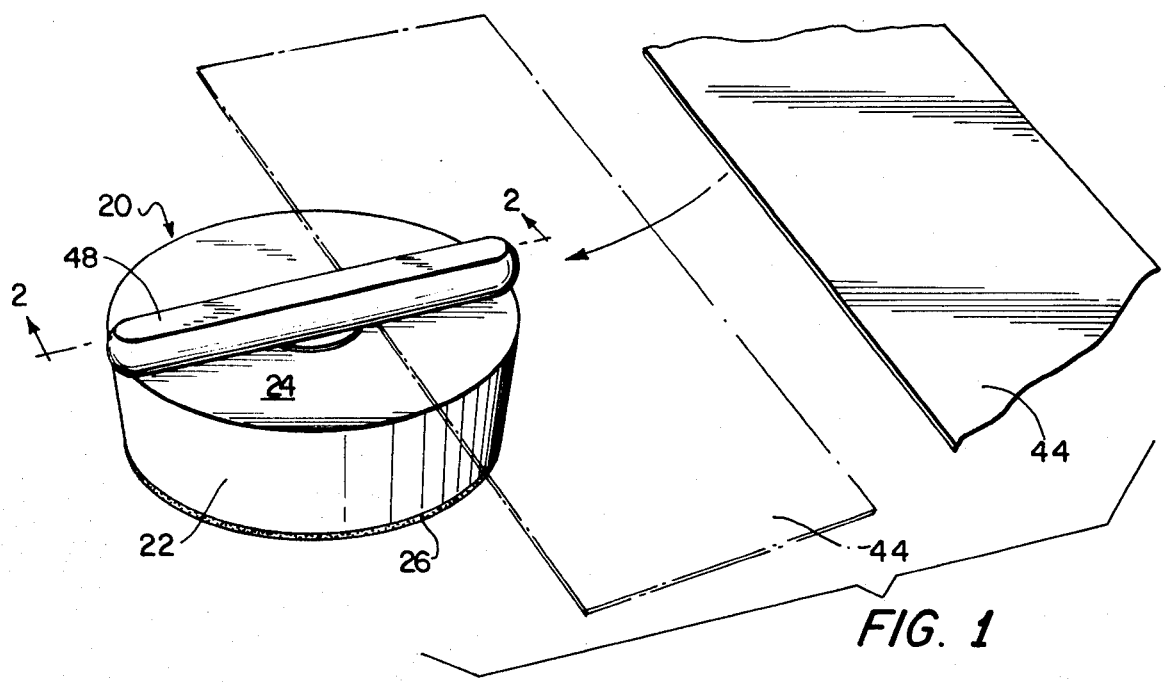
FIG. 1 is a perspective view of one form of the device of the present invention illustrating its use.
Figure 2:
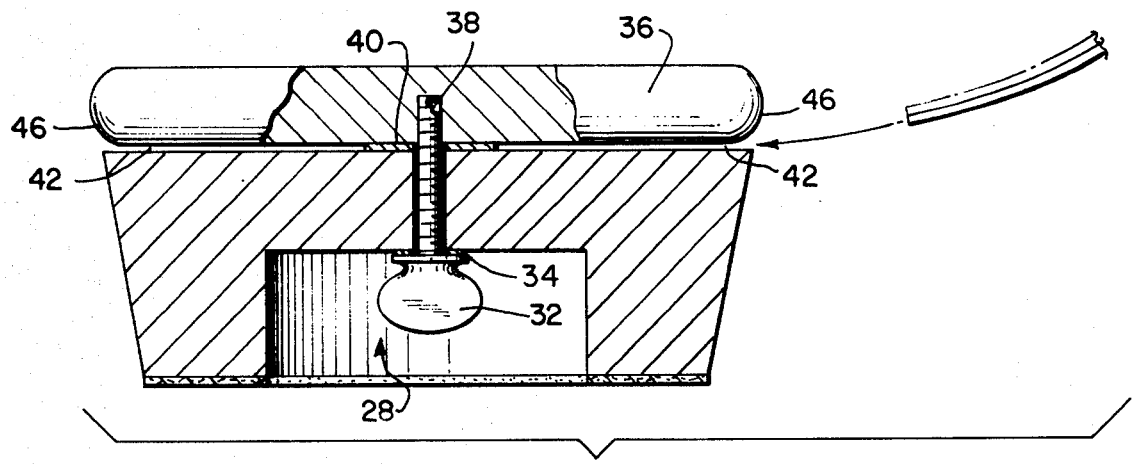
FIG. 2 is a sectional view taken along the line 2—2 of FIG. 1, looking in the direction of the arrows, portions thereof being shown in elevation.

In FIGS. 1 and 2, there is illustrated a device for checking bills of currency to detect bills which are stuck together which device is generally designated 20 and includes a base 22 of disk shape preferably made of metal, marble, or other heavy material to anchor the device in position when in use. Disk 22 has a flat upper surface 24 and friction material such as rubber may be applied to the lower surface as indicated at 26.

As shown in FIG. 2, disk 22 is provided with a central recess 28 which extends from a portion intermediate the height of the disk to the lower extremity thereof, and the central portion of the disk is bored out as indicated at 30 for insertion of a retaining bolt 32 of the thumbscrew washer type therethrough, one end of which bolt extends upwardly to a point above upper surface 24 of base 22. A lock washer is indicated at 34.

In accordance with the present invention, there is provided an elongated bar 36 which is generally of cylindrical shape, the bar having a central threaded bore 38 which is threadedly engaged by the upper end of bolt 32. A spacer in the form of a washer 40 is interposed between flat upper surface 24 of disk 22 and the lower extremity of elongated bar 36 thereby forming a space 42 between the two members, which space is approximately 0.006 inches in order to receive a bill of currency of any denomination designated 44 which is approximately 0.004 inches in thickness.

The ends of elongated bar 36 are beveled at 46 to facilitate insertion of bill 44 between the opposed faces of elongated bar 36 and disk 22, which portions serve as gauging surfaces in checking the bill.

The upper surface of elongated bar 36 may be flattened as indicated at 48 for placement of indicia thereon for advertising, names or slogans.

In use, device 20 is placed on a supporting surface handy to the person counting bills of currency and, as each bill is counted, the bill is inserted into space 42 between elongated bar 36 and upper surface 24 of base 22, either by inserting the bill therebetween in the manner illustrated in FIG. 2, or sliding the bill perpendicular to elongated bar 36 along upper surface 24 of base 22.

Since the height of space 24 is substantially the same as the thickness of bill 44, only one bill will fit between elongated bar 36 and base 22, thereby providing a go - no go test for determining whether any bills are stuck together. Therefore, the bills may be quickly run through the device of the present invention without special care or manipulation by the fingers to determine whether or not two or more bills are stuck together since any attempt to pass more than one bill through the device will be rejected.

DESCRIPTION OF FORM OF INVENTION ILLUSTRATED IN FIGS. 3 AND 4

Figure 3:
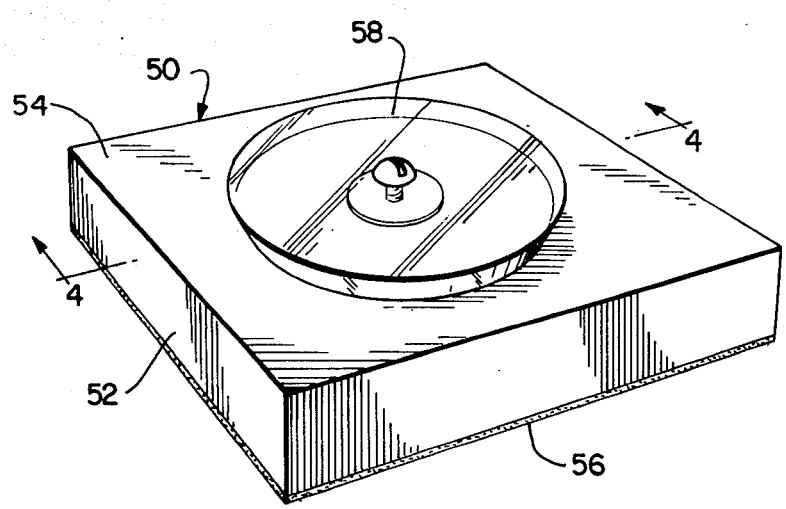
FIG. 3 is a perspective view of a modified form of the device of the present invention.
Figure 4:
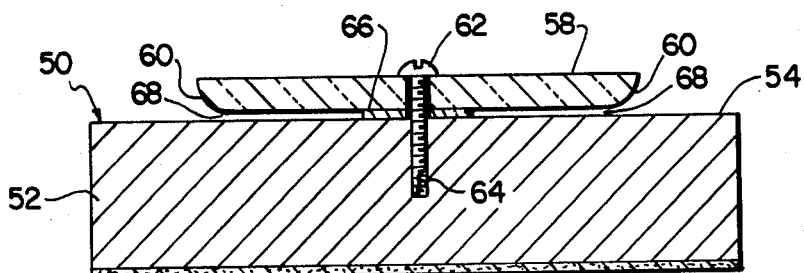
FIG. 4 is a sectional view taken along the line 4—4 of FIG. 3, looking in the direction of the arrows.

In FIGS. 3 and 4, there is illustrated a modified form of the device of the present invention which is generally designated 50, and includes a base 52 which is of substantially square shape and made of metal, marble or other heavy material. Base 52 includes a flat upper surface 54, and a friction material 56 is applied to the lower surface thereof just as in the form of invention illustrated in FIGS. 1 and 2, for preventing accidental movement of the device during use.

In accordance with this form of the invention, a disk 58 of plastic or other suitable material is centrally positioned on base 52, with the lower face of the disk being in spaced parallel relation to upper surface 54. The lower peripheral edge of disk 58 is beveled at 60, as shown to advantage in FIG. 4.

Disk 58 is held in fixed space relation to base 52 by a bolt 62 which extends axially through disk 58 and is threadedly engaged with a threaded central bore 64 in the upper portion of base 52. A spacer in the form of a washer 66 is interposed between upper surface 54 of base 52 and the lower surface of disk 58 in order to provide a space 68 of uniform height, which is approximately 0.006 inches in order to accommodate a single bill of currency which is of slightly less thickness. The use of the device illustrated in FIGS. 3 and 4 is substantially the same as the device illustrated in FIGS. 1 and 2 with the exception that bill 44 may be inserted into space 68 at any point along the periphery of disk 58.

DESCRIPTION OF FORM OF INVENTION ILLUSTRATED IN FIG. 5

Figure 5:
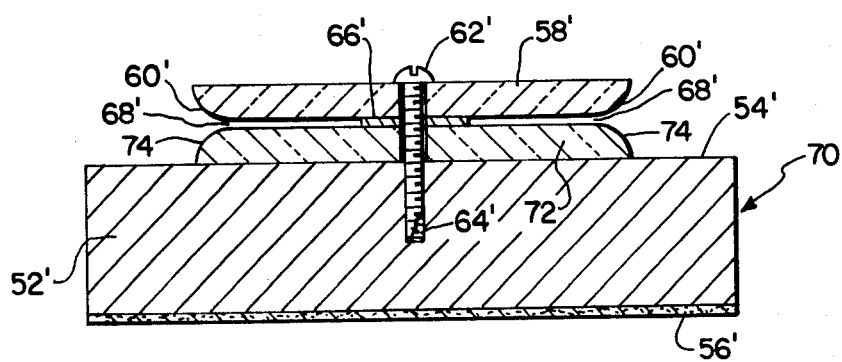
FIG. 5 is a sectional view, similar to FIG. 4, showing another modified form of the present invention.

In FIG. 5, there is illustrated another modified form of the present invention generally designated 70, which is similar in construction to the form of the invention illustrated in FIGS. 3 and 4. In this form of the invention, therefore, like parts have been identified by like, primed numbers.

In accordance with this form of the invention, a second disk 72 which is of the same construction as disk 58', is interposed between spacer 66' and upper surface 54' of base 52'. The upper peripheral edge of disk 72 is beveled at 74, and is in facing relation with beveled peripheral edge 60' of disk 58'. It will be apparent from a consideration of FIG. 5 that beveled edges 60' and 74 considerably facilitate the insertion of bills of currency into space 68' between the gauging surfaces formed by the flat surfaces forming the lower extremity of disk 58' and the upper surface of disk 72.

DESCRIPTION OF FORM OF INVENTION ILLUSTRATED IN FIG. 6

Figure 6:
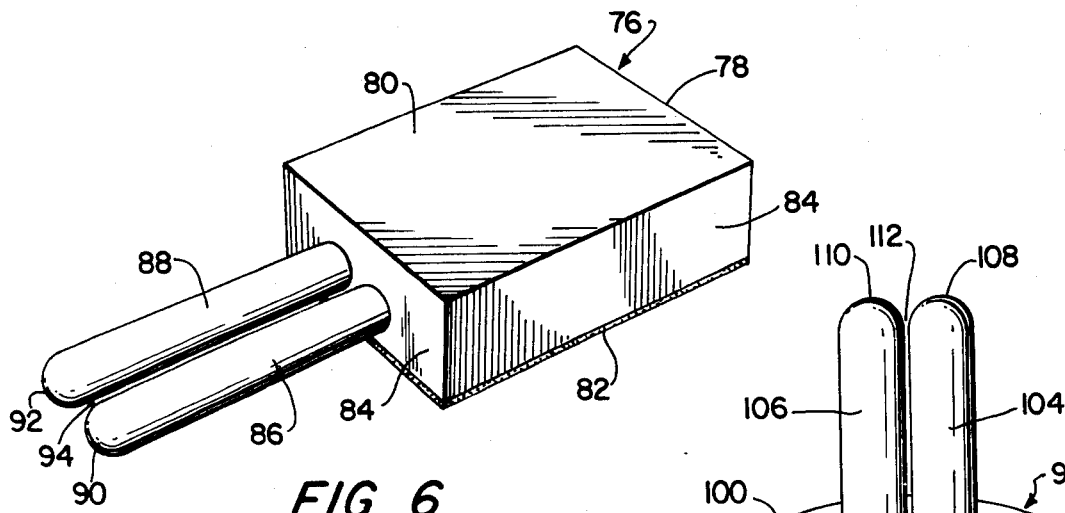
FIG. 6 is a perspective view of still another modified form of the present invention.

In FIG. 6, there is illustrated still another modified form of the present invention generally designated 76 which includes a base 78 which is of rectangular conformation and includes an upper surface 80 and a lower surface to which an adhesive 82 is applied for fixedly holding the base on a supporting surface. Base 78 further includes a plurality of vertical sidewalls 84 on one of which is fixedly mounted a pair of parallelly arranged, spaced cylindrical pins 86 and 88, the inner ends of which are threadedly engaged in bores in base 78 or secured to all 84 in any other suitable manner. The opposite ends of pins 86 and 88 are rounded as indicated at 90 and 92, thereby facilitating insertion of a bill into space 94 between the proximate portions of pins 86 and 88 which provide gauging surfaces when bills are inserted therein. As in the other forms of the invention, space 94 is of predetermined distance, approximately 0.006 inches, slightly larger than the thickness of a bill of currency.

It will be noted from a consideration of FIG. 6 that pins 86 and 88 extend in a horizontal plane in order to permit bills to be inserted vertically between pins 86 and 88. This form of the invention is particularly useful where device 76 is applied to the edge of the supporting surface with pins 86 and 88 overhanging the edge of the supporting surface.

DESCRIPTION OF FORM OF INVENTION ILLUSTRATED IN FIG. 7

Figure 7:
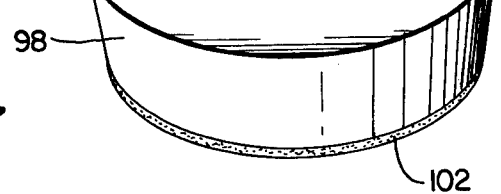
FIG. 7 is a perspective view of a still further modified form of the present invention.

In FIG. 7, there is illustrated still further a modified form of the present invention generally designated 96 which includes a base 98 of disk shape having a flat upper surface 100, and a friction material or adhesive 102 applied to the lower surface thereof.

In accordance with this form of the invention, a pair of spaced, cylindrical pins 104, 106 extend vertically from the central portion of upper surface 100, the lower end of the pins being threadedly engaged with base 98 or secured thereto in any other suitable manner. The upper ends of the pins 104, 106 are rounded as indicated at 108, 110 to facilitate insertion of bills in space 112 between pins 104, 106. Just as in the form of the invention illustrated in FIG. 6, pins 104, 106 are spaced apart approximately 0.006 inches in order to permit a bill to be passed horizontally through space 112.

The present invention affords simple and economic means for checking bills of currency in order to determine whether or not any are stuck together, the device providing an accurate, positive indication by permitting only a single bill of currency to pass therethrough.

Although the device of the present invention is particularly designated for checking U.S. bills of currency, it is to be understood that it may be used for bills of currency of other countries or for any other paper materials or the like of uniform thickness which tend to stick together. Various other changes may be made within the scope of the appended claims.

What is claimed is:

1. A device for checking bills of currency to detect bills that are stuck together, comprising:
    (a) a base having a substantially flat lower face for supporting said device on a flat surface;
    (b) said base being made of a heavy material to anchor said device in place when in use;
    (c) said base including a first means providing a first gauging surface;
    (d) a second means including a second gauging surface overlying at least a portion of said first gauging surface;
    (e) spacer means disposed between said first and second gauging surfaces, said spacer means having a height at least equal to the thickness of a single bill of currency and less than the thickness of two bills of currency;
    (f) a third means substantially centrally positioned in said base aligned with and cooperating with said spacer means and securing said second means to said base and positively fixing and locking said second gauging surface in parallel spaced relationship to said first gauging surface whereby said first and second gauging surfaces are maintained spaced apart a distance equal to said spacer means height; and, said first gauging surface being considerably greater in surface area than said second gauging surface so that said bills of currency can be rested on and stably supported thereby during the gauging operation: and,
    (g) said second means having a beveled peripheral edge portion extending from said second gauging surface for facilitating insertion of a bill of currency between said gauging surfaces whereby only a single bill of currency can be passed between said gauging surfaces and bills which are stuck together are detected by the inability to be passed between said gauging surfaces.

2. The device of claim 1, wherein:
    (a) said second means comprises an elongated bar of generally cylindrical shape.

3. The device of claim 1, wherein:

(a) said second means comprises a substantially flat disk.

4. The device of claim 1, wherein:
(a) said spacer means includes a washer.

5. The device as defined in claim 4, wherein:
(a) said washer being annularly shaped; and,
(b) said third means includes a retaining bolt extending through said washer aperture and having a portion thereof secured to said second means.

6. The device as defined in claim 5, wherein:
(a) a lock washer cooperates with said retaining bolt for maintaining positive securement of said retaining bolt with said second means.

7. The device as defined in claim 4, wherein:
(a) said washer having a height at least equal to 0.004 inches.

8. The device as defined in claim 4, wherein:
(a) said washer having a height substantially equal to 0.006 inches.

9. The device as defined in claim 2, wherein:
(a) said elongated bar having spaced beveled edges substantially aligned with the periphery of said base; and,
(b) said third means substantially centrally positioned between said bar spaced ends to thereby permit insertion of a bill of currency from either end.

10. The device as defined in claim 2, wherein:
(a) said base being circular-shaped.

11. The device as defined in claim 3, wherein:
(a) said base being generally rectangularly-shaped.

12. The device of claim 1, wherein
(a) said first means comprises the flat upper surface of said base.

13. The device of claim 1, with the addition of
(a) friction means secured to the bottom of said base for preventing accidental movement of the device during use.

* * * * *